US012705603B2

(12) United States Patent
Bieber et al.

(10) Patent No.: US 12,705,603 B2
(45) Date of Patent: Aug. 11, 2026

(54) SYSTEM AND METHOD FOR SHARING A DISTRIBUTED REVOCATION LIST ON A BLOCKCHAIN

(71) Applicant: NAGRAVISION SARL, Cheseaux-sur-Lausanne (CH)

(72) Inventors: Yann Bieber, Cheseaux-sur-Lausanne (CH); Vishruta Gowda Rudresh, Atlanta, GA (US)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 130 days.

(21) Appl. No.: 18/072,130

(22) Filed: Nov. 30, 2022

(65) Prior Publication Data

US 2024/0177144 A1 May 30, 2024

(51) Int. Cl.

*G06Q 20/36* (2012.01)
*G06Q 20/10* (2012.01)
*G06Q 20/38* (2012.01)

(52) U.S. Cl.

CPC ......... *G06Q 20/3674* (2013.01); *G06Q 20/10* (2013.01); *G06Q 20/389* (2013.01); *G06Q 2220/00* (2013.01)

(58) Field of Classification Search

None

See application file for complete search history.

(56) References Cited

U.S. PATENT DOCUMENTS

2020/0028667 A1* 1/2020 Castinado ............. H04L 9/3239
2020/0162485 A1* 5/2020 Jevans ................ H04L 63/0428
2020/0403924 A1* 12/2020 Jiang ..................... H04L 47/283
2021/0056520 A1* 2/2021 Thomsen ............. G06Q 20/027
2021/0374731 A1 12/2021 Kim
2023/0034169 A1* 2/2023 Ferenczi ............. H04L 63/0823
2023/0162174 A1* 5/2023 Brasse ............... G06Q 20/4016 705/75
2023/0245103 A1* 8/2023 Lacavera .................. H04L 9/14 705/66
2023/0300147 A1* 9/2023 Zhu ........................ H04L 63/14 726/23

FOREIGN PATENT DOCUMENTS

CN 112149173 A 12/2020
CN 113783899 A 12/2021
WO WO-2021136251 A1 * 7/2021 ............. G06Q 40/04

OTHER PUBLICATIONS

International Search Report and Written Opinion mailed on Mar. 5, 2024 in International Application No. PCT/US2023/081242, 17 pages.

Ohlhaver et al., "Decentralized Society: Finding Web3's Soul", May 11, 2022, retrieved from the internet: URL:https://papers.ssrn.com/sol3/papers.cfm?abstract_id=4105763, 37 pages.

* cited by examiner

*Primary Examiner* — Patrick Mcatee
*Assistant Examiner* — Christine Dang
(74) *Attorney, Agent, or Firm* — POLSINELLI LLP

(57) ABSTRACT

A system for sharing a distributed revocation list on a blockchain includes circuitry that identifies an access attempt by a wallet on a first blockchain network, and adds the wallet to a blacklist. The blacklist identifies the wallet as suspicious. The circuitry generates a soulbound token, and airdrops the soulbound token into the wallet. The soulbound token identifies that the wallet belongs to the distributed revocation list and identifies the wallet as a suspicious wallet to blockchain networks.

19 Claims, 12 Drawing Sheets

SYSTEM AND METHOD FOR SHARING A DISTRIBUTED REVOCATION LIST ON A BLOCKCHAIN

BACKGROUND

Field of the Invention

The present disclosure relates to systems and associated methodologies for sharing on a blockchain a distributed revocation list (or a decentralized blacklist) of suspicious wallets using soulbound non-transferable tokens (NFTs).

Description of the Related Art

Smart contracts are transaction protocols hosted on a blockchain that allow for the digital verification, control, and execution of contracts. A smart contract executes automatically when the parties to an agreement fulfil its terms. Today when a smart contract wants to prevent vicious users (represented by individual wallets connected to the blockchain) from accessing its applications, it has to interface various blacklists of suspicious wallets that are maintained by a number of different parties. As there is no method to synchronize all of these different blacklists immediately, it is potentially very easy for a hacker to exit a blockchain ecosystem with stolen funds after a successful exploit attack. Thus, these blockchain ecosystems are vulnerable to fund laundering.

Therefore, a system for sharing blacklists of suspicious wallets with low latency across a blockchain ecosystem is desirable to address these and other deficiencies of current systems.

SUMMARY

The present disclosure describes a distributed revocation list sharing system and method that solves cybersecurity problems in conventional blockchain ecosystems. Specifically, the present disclosure describes a distributed revocation list sharing system and method with the following features.

In an exemplary aspect of the present disclosure, a system for sharing a distributed revocation list t on a blockchain includes circuitry. The circuitry identifies an access attempt by a wallet on a first blockchain network, adds the wallet to a blacklist which identifies the wallet as suspicious, generates a soulbound token, and airdrops the soulbound token into the said wallet. The soulbound token identifies that the wallet belongs to the distributed revocation list and identifies the wallet as a suspicious wallet to blockchain networks.

In an exemplary aspect of the present disclosure, upon receipt of a transaction request from the wallet, a second blockchain network determines whether the wallet includes the soulbound token. If the wallet includes the soulbound token, the second blockchain network rejects the transaction request.

In an exemplary aspect of the present disclosure, the circuitry further detects an attempt to transfer funds by the wallet to another wallet. Upon detection of the attempt, the circuitry adds the other wallet to the blacklist. Further, the circuitry generates another soulbound token, and airdrops the other soulbound token into the other wallet.

In an exemplary aspect of the present disclosure, upon receipt of a transaction request from the other wallet, the second blockchain network determines whether the other wallet includes the other soulbound token and rejects the transaction request if the other wallet includes the other soulbound token.

In an exemplary aspect of the present disclosure, the circuitry further monitors a transaction conducted by the wallet on the first blockchain network to identify the access attempt.

In an exemplary aspect of the present disclosure, the circuitry further determines whether the access attempt is false. When the access attempt is determined to be false, the circuitry revokes the soulbound token in the wallet, and removes the wallet from the blacklist.

In an exemplary aspect of the present disclosure, the circuitry further performs revocation of the soulbound token by amending metadata of the soulbound token.

In an exemplary aspect of the present disclosure, the circuitry further determines whether the access attempt is false based on context information related to the transaction.

In an exemplary aspect of the present disclosure, the circuitry further detects an attempt of the wallet to transfer the soulbound token. Upon detection of the attempt, the circuitry blocks the transfer of the soulbound token.

In an exemplary aspect of the present disclosure, upon receipt of a transaction request from the wallet, the first blockchain network determines whether the wallet is in the blacklist. If the wallet is in the blacklist, the first blockchain network rejects the transaction request.

In an exemplary aspect of the present disclosure, the circuitry further pauses the first blockchain network upon identification of the access attempt.

In an exemplary aspect of the present disclosure, upon receipt of the transaction request from the wallet, the second blockchain network reads a local whitelist, and determines whether the wallet includes the soulbound token that is airdropped from a source in the local whitelist. When a result of the determination is affirmative, the second blockchain network denies the request. When the result of the determination is negative, the second blockchain network processes the request based on a policy of the second blockchain network.

In an exemplary aspect of the present disclosure, the circuitry further generates a global whitelist. The second blockchain network obtains the global whitelist, and updates the local whitelist based on the obtained global whitelist.

In an exemplary aspect of the present disclosure, the circuitry further airdrops the soulbound token with a highest priority.

In an exemplary aspect of the present disclosure, the circuitry further airdrops the other soulbound token with a highest priority.

In an exemplary aspect of the present disclosure, the circuitry further identifies an access attempt including at least one of an exploit, a heist, fund laundering, theft, a phishing attack, an unauthorized intrusion, and an unauthorized access attempt.

In an exemplary aspect of the present disclosure, each of the first and second blockchain networks includes a smart contract.

In an exemplary aspect of the present disclosure, a method for sharing a distributed revocation list on a blockchain includes identifying, with circuitry, an access attempt by a wallet on a first blockchain network. The method further includes adding, with the circuitry, the wallet to a blacklist which identifies the wallet as suspicious. The method also includes generating and airdropping, by the circuitry, a soulbound token into the wallet. The soulbound token identifies that the wallet belongs to the distributed revocation list and identifies the wallet as a suspicious wallet to blockchain networks.

In an exemplary aspect of the present disclosure, a non-transitory computer readable medium includes computer readable instructions. When the computer readable instructions are executed by at least one processor, the at least one processor is caused to perform a method. The method includes identifying an access attempt by a wallet on a first blockchain network. The method further includes adding the wallet to a blacklist which identifies the wallet as suspicious. The method also includes generating a soulbound token, and airdropping the soulbound token into the wallet. The soulbound token identifies that the wallet belongs to the distributed revocation list and identifies the wallet as a suspicious wallet to blockchain networks.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1A:
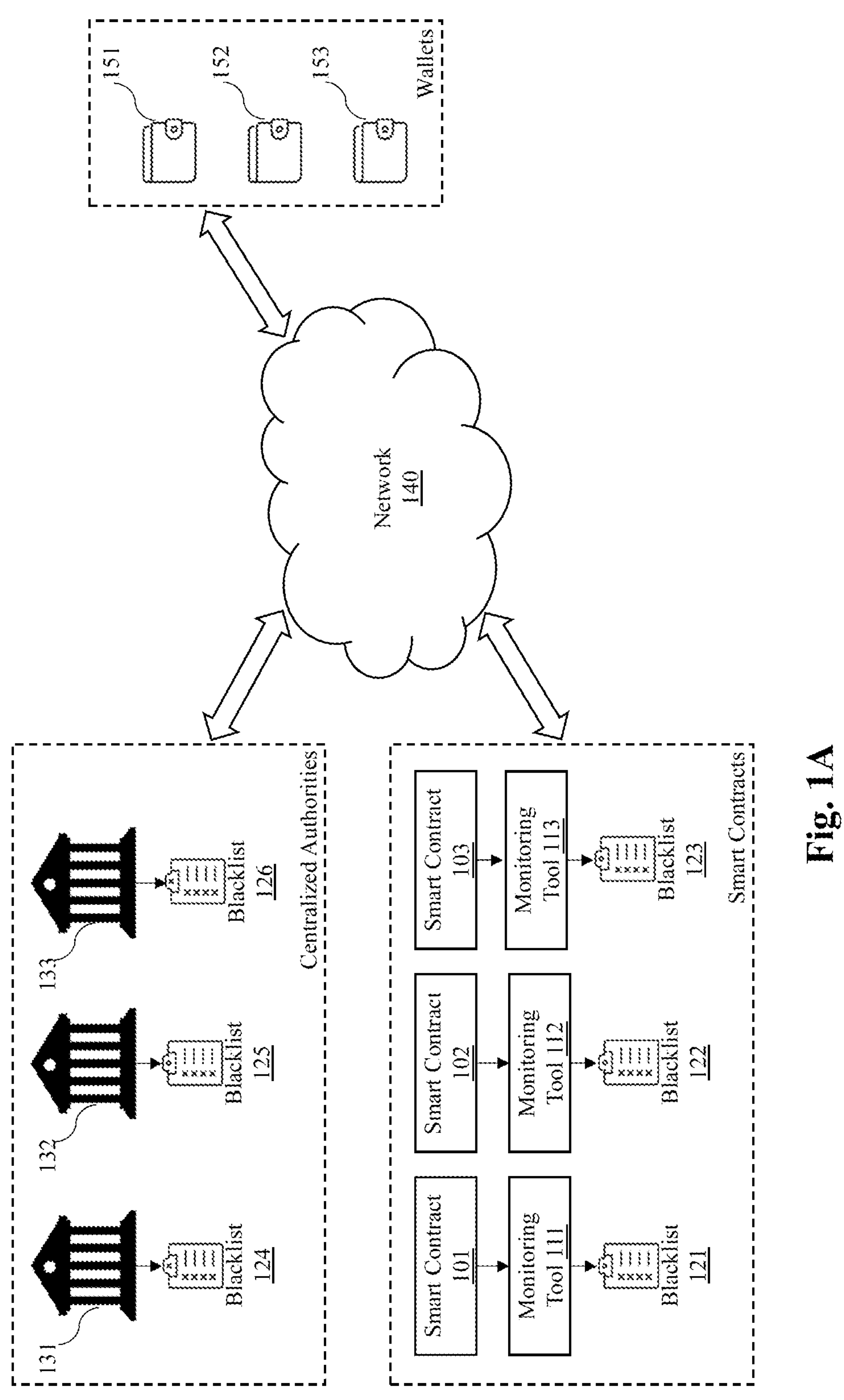
FIG. 1A is an exemplary block diagram of the deployment of a blockchain ecosystem.

Referring now to the drawings, wherein like reference numerals designate identical or corresponding parts throughout the several views, FIG. 1A illustrates a block diagram of an exemplary blockchain ecosystem in which wallets 151, 152, and 153 can conduct transactions with smart contracts 101, 102, and 103. As shown in FIG. 1A, both the smart contracts 101. 102, and 103 and the wallets 151, 152, and 153 are connected to a network 140. Monitoring tools 111, 112, and 113 are responsible for monitoring the transactions conducted on the smart contracts 101, 102, and 103, respectively. From the monitored transactions, the monitoring tools 111, 112, and 113 generate and maintain blacklists 121, 122, and 123 for the respective smart contracts 101, 102, and 103. For example, after hacking attempts are detected, these blacklists 121, 122, and 123 can be dynamically updated by the respective monitoring tools 111, 112, and 113 and implemented directly into the respective smart contracts 101, 102, and 103. Alternatively, admins of a smart contract can manually create and update a blacklist (not shown) for the smart contract.

Apart from blacklists 111, 112, and 113, various centralized authorities and entities in the blockchain ecosystem can generate and maintain blacklists of suspicious wallets as well. As shown in FIG. 1A, centralized authorities 131, 132, and 133 create blacklists 124, 125, and 126, respectively. These blacklists 124, 125, and 126 can be provided off-chain or on-chain as oracles, an example of which is Chainalysis's oracles for sanctions screening based on the Office of Foreign Assets Control (OFAC) data. Alternatively, the blacklists 124, 125, and 126 can be provided off-chain by the community or centralized entities as address tags on a blockchain explorer. For example, address tags such as "exploit", "heist", "phish/hack" or the like can be provided on the Ethereum (ETH) Blockchain explorer.

As a result, to prevent hackers to wash stolen funds, each smart contract needs to refer to a number of different blacklists of suspicious wallets. There is no common way to share or synchronize immediately all these blacklists to reduce the impacts of blockchain protocol exploits.

In order to increase privacy, a virtual currency mixer (or called "a cryptocurrency anonymizer") indiscriminately facilitates anonymous transactions by obfuscating their origin, destination, and counterparties, with no attempt to determine their origin. Typically, a virtual currency mixer receives a variety of transactions and mixes them together before transmitting them to their individual recipients. Thus, virtual currency mixers can be used by illicit actors to wash stolen funds. However, the exemplary blockchain ecosystem illustrated in FIG. 1A has no way to identify and stop fund laundry when a virtual currency mixer is involved.

Figure 1B:
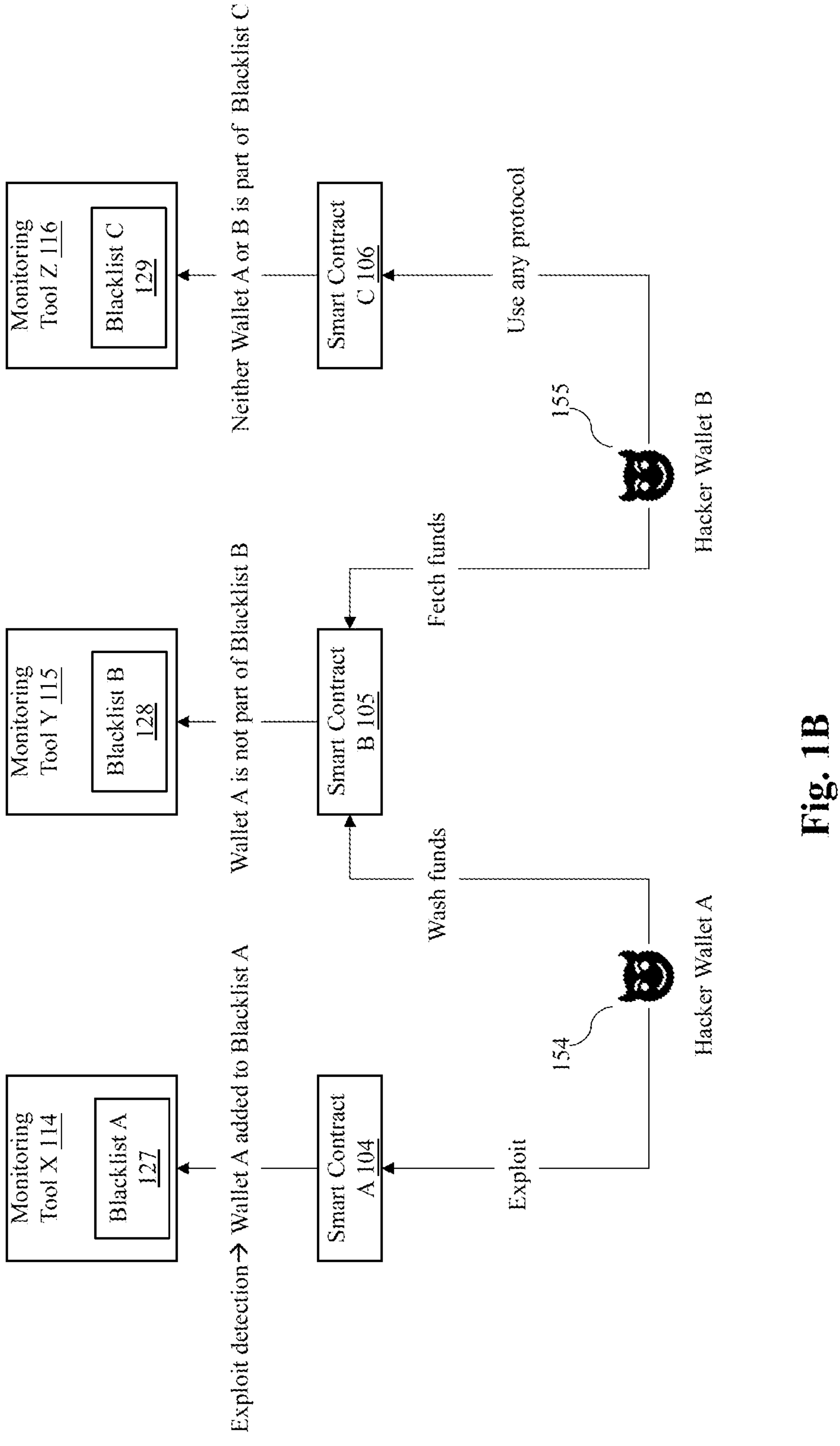
FIG. 1B is an exemplary scenario in which a hacker manages to perform money laundering in a blockchain ecosystem after an exploit attack.

FIG. 1B illustrates an exemplary scenario in which a hacker manages to perform money laundering in a blockchain ecosystem after an exploit. In FIG. 1B, monitoring tools X 114, Y 115 and Z 116 maintain blacklist A 127, B 128, and C 129 for smart contracts A 104, B 105, and C 106. The smart contract B 105 can be a virtual currency mixer, and the smart contracts A 104 and C 106 can be any smart contracts. After a successful detection of an exploit by a wallet A 154 to the smart contract A 104, the monitoring tool X 114 adds the wallet A 154 into the blacklist A 127 related to the smart contract A 104. However, as the wallet A 154 is not in the blacklist B 128 related to the smart contract B 105, the wallet A 154 can wash funds with the smart contract B 105, and another wallet B 155 can fetch funds from the smart contract B 105. Also, both the wallet A 154 and the wallet B 155 can use the smart contract C 106 because neither of them is in the blacklist C 129 related to the smart contract C 106. Because the update in a blacklist is not reflected sufficiently quickly in the other blacklists, adding the wallet A 154 into the blacklist A 127 does not prevent the wallet A 154 from laundering stolen funds via other smart contracts.

Figure 2A:
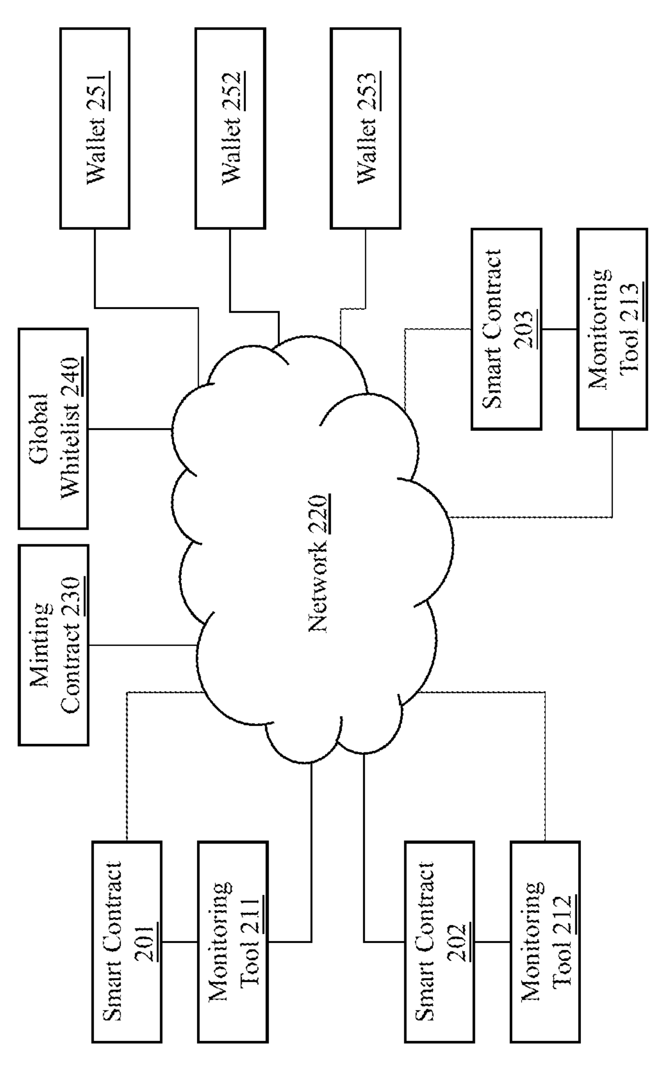
FIG. 2A is an exemplary block diagram of the deployment of a blockchain ecosystem according to exemplary aspects of the present disclosure.

FIG. 2A is an exemplary block diagram of a blockchain ecosystem according to exemplary aspects of the present disclosure. As shown in FIG. 2A, smart contracts 201, 202, and 203 and wallets 251, 252, and 253 are connected to a network 220. Monitoring tools 211, 212, and 213 monitor the transactions conducted on the smart contracts 201, 202, and 203, respectively, and maintain blacklists (not shown in FIG. 2A) for the respective smart contracts 201, 202, and 203. Also connected to the network 220 is a minting contract 230, which mints soulbound NFTs and revokes the soulbound NFTs it has minted, in response to calls from the monitoring tools 211, 212, and 213. Further, the blockchain ecosystem includes a global whitelist 240 comprising a list of trusted or approved sources of NFTs. For example, the trusted or approved source of NFTs can include a list of minting contracts and/or a list of monitoring tools. The global whitelist 240 can be created by the community or centralized authorities (not shown), and published on a website, for example.

Figure 2B:
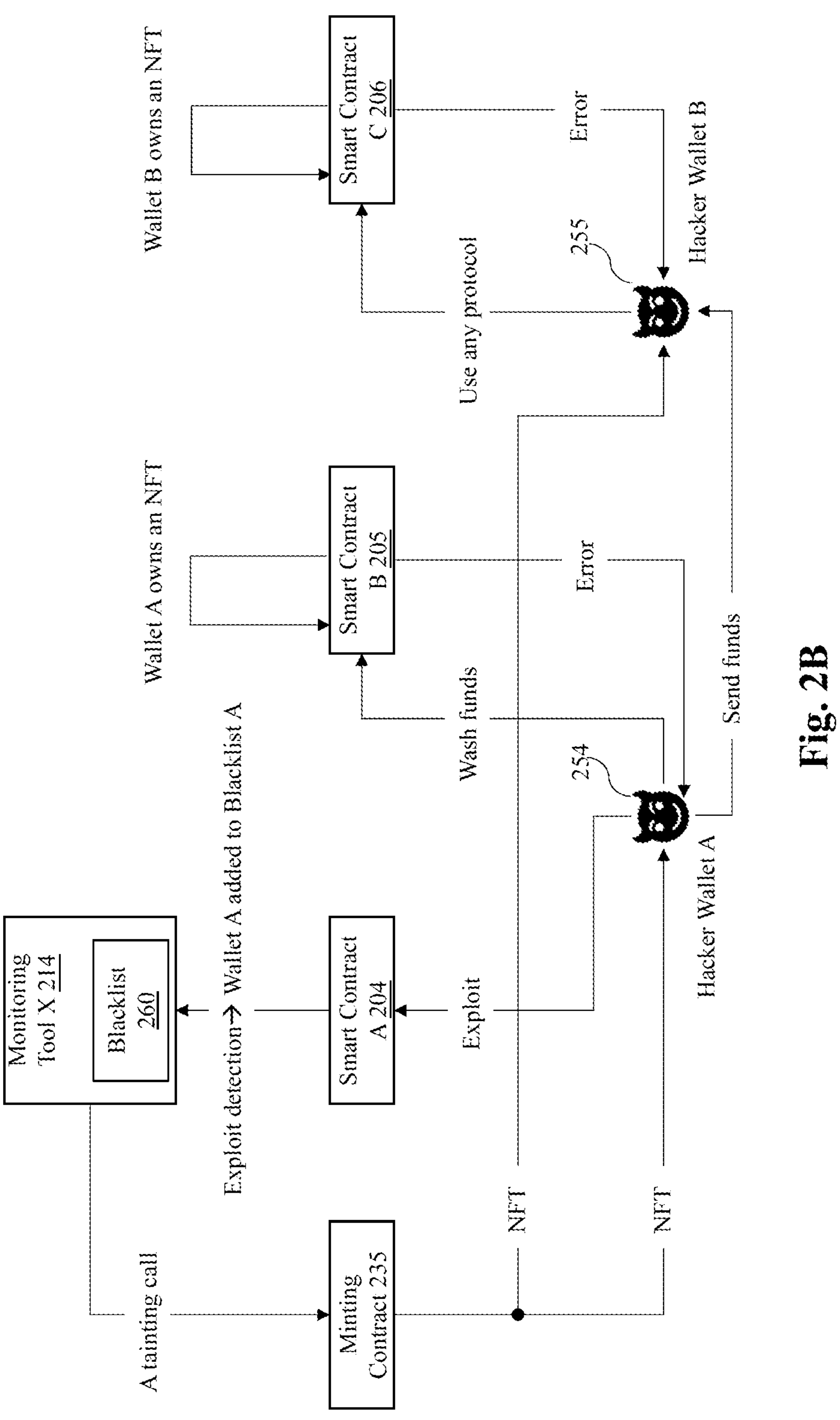
FIG. 2B is an exemplary scenario in which a hacker is prevented from getting away with stolen funds according to exemplary aspects of the present disclosure.

FIG. 2B is an exemplary scenario in which a hacker is prevented from getting away with stolen funds according to exemplary aspects of the present. In FIG. 2B, a monitoring tool X 214 monitors transactions on a smart contract A 204, and updates a blacklist 260 when a hacking attempt is identified from the transactions. The hacking attempt can be an exploit, a heist, fund laundering, theft, a phishing attack, an unauthorized intrusion, and an unauthorized access attempt, for example. For the sake of clarity, no monitoring tool or blacklist is shown with respect to smart contract B 205 or C 206.

Upon detection of an exploit by a wallet A 254 to the smart contract A 204, the monitoring tool X 214 adds the wallet A 254 into the blacklist 260 to prevent further exploits from the same wallet. For example, when the smart contract A 204 receives a transaction request from a wallet, it reads the blacklist 260 to determine whether the requesting wallet is in the blacklist 260. If the requesting wallet is in the blacklist 260, the smart contract A 204 denies the transaction request. If the requesting wallet is not in the blacklist 260, the smart contract A 204 proceeds to process the transaction request in accordance with its policies.

One skilled in the art can appreciate that further remediation is possible. For example, as an incident response to the detected exploit, the monitoring tool X 214 can pause the smart contract A 204 until security is restored.

Moreover, upon detection of the exploit by the wallet A 254, the monitoring tool X 214 sends a tainting call to a custom NFT minting contract 235 such that a dedicated soulbound NFT is airdropped into the wallet A 254. The tainting call is sent with the highest priority to the blockchain to avoid that the wallet A 254 manages to use other smart contracts (e.g., the smart contract B 205 or C 206) between the detection of the exploit event and the airdropping of the soulbound NFT.

The minting contract 235 monitors the blockchain to detect an attempt to transfer the NFT it has airdropped. In this way, when the wallet A 254 tries to transfer the NFT to another wallet, the minting contract 235 blocks such a transfer. For example, the minting contract 235 can be programmed to systematically refuse the transfer of the NFT after the first airdrop of that NFT. Without departing the scope of the present disclosure, this function can be implemented by similar technologies for non-EVM chains.

In order to detect a transfer of the stolen fund from the wallet A 254 to other wallets such as a wallet B 255, the monitoring tool X 214 monitors the blockchain for transfer transactions coming from the wallet A 254. When such a transfer attempt is identified, the monitoring tool X 214 reacts by sending another tainting call to the minting contract 235 such that another NFT is minted and airdropped into the wallet B 255. Once again, this tainting call is sent with the highest priority to the blockchain. In addition, the monitoring tool X 214 adds the wallet B 255 into the blacklist 260.

When the tainted wallet A 254 or the tainted wallet B 255 requests to use any other smart contracts (e.g., the smart contract B 205 or C 206), the smart contracts determines whether the requesting wallet has a soulbound NFT from a trusted source (e.g., the minting contract 235 and/or the monitoring tool X 214). If the wallet has such a soulbound NFT, the transaction request is denied.

The process of generating and airdropping a tainting NFT to a suspicious wallet can be very quick. Typically, it can be completed when a next block is added to the blockchain. There is no need to communicate or synchronize many lengthy blacklists on the blockchain. In this way, a decentralized, distributed blacklist can be real-time shared across the whole blockchain ecosystem. Accordingly, fund laundry can be effectively tackled even when a virtual currency mixer (if compatible) is involved.

The illustration of FIGS. 2A-2B is not restrictive, and other variations are possible without departing from the scope of the present disclosure. For example, FIG. 2A illustrates three monitoring tools 211-213, three smart contracts 201-203, and three wallets 251-253. However, this is only for the sake of clarity since in practice there may be many more such components in the blockchain ecosystem. Furthermore, FIG. 2B illustrates that the blacklist 260 is a part of the monitoring tool X 214. However, this is only for the sake of clarity as they can be separate components, or the blacklist 260 can be a part of the smart contract A 204. Further, different blocks illustrated in FIGS. 2A-2B may be separate, independent entities, or may form part of a single entity without limitation.

Figure 3:
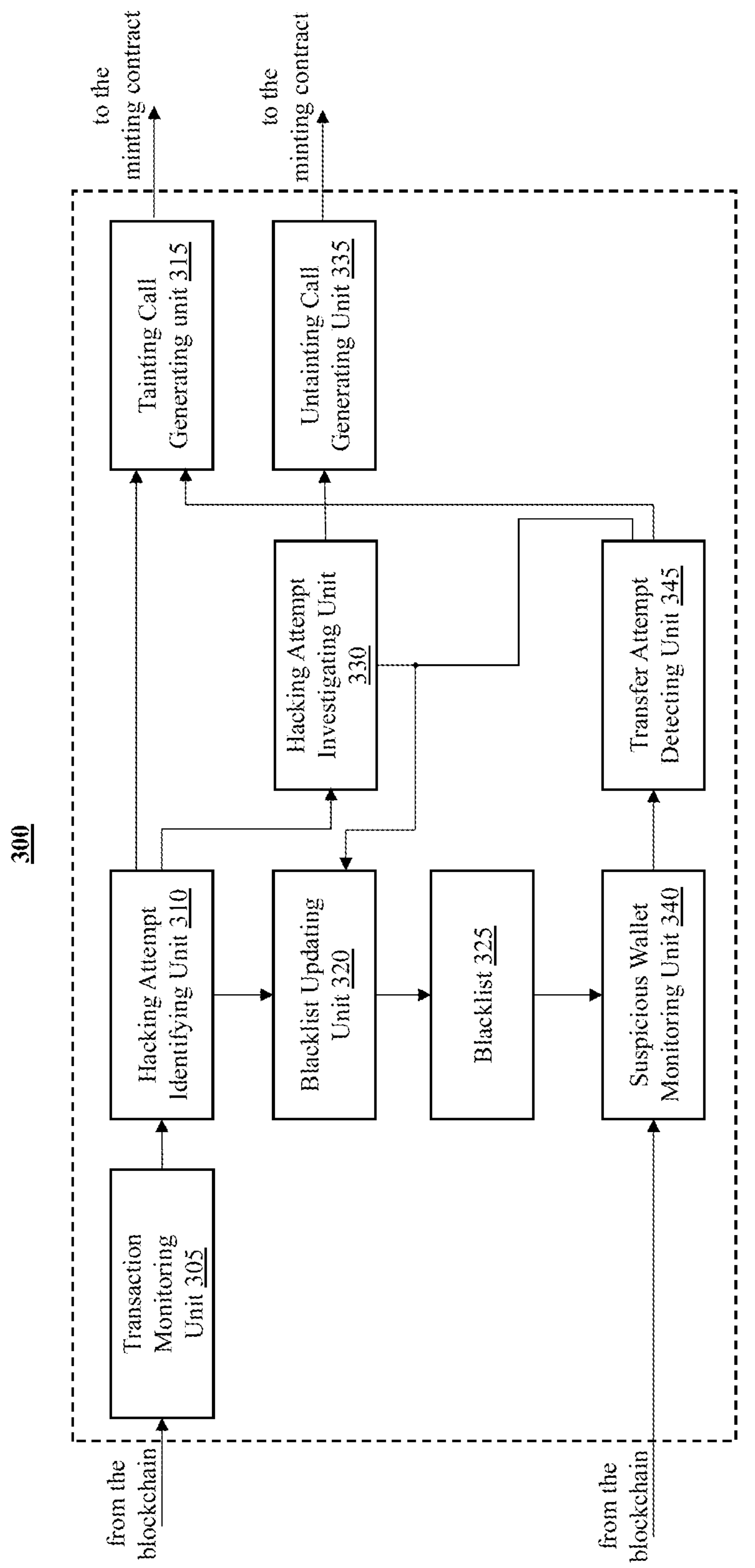
FIG. 3 is a functional block diagram of a monitoring tool according to exemplary aspects of the present disclosure.

FIG. 3 is a functional block diagram of a monitoring tool according to exemplary aspects of the present disclosure. The monitoring tool 300 in FIG. 3 includes a transaction monitoring unit 305, a hacking attempt identifying unit 310, a tainting call generating unit 315, a blacklist updating unit 320, and a blacklist 325. The transaction monitoring unit 305 monitors transactions conducted with a smart contract. From the monitored transactions, the hacking attempt identifying unit 310 detects a hacking attempt by a wallet to the smart contract. Upon detecting the hacking attempt, the blacklist updating unit 320 adds the wallet into the blacklist 325. At the same time, the tainting call generating unit 315 generates and sends a tainting call with respect to the wallet to a minting contract. Although the blacklist 325 is shown as being included in the monitoring tool 300, it is possible that the blacklist 325 is separate from the monitoring tool 300, for example, being stored in the smart contract.

In addition, the monitoring tool 300 can include a hacking attempt investigating unit 330 and an untainting call generating unit 335. The hacking attempt investigating unit 330 performs an investigation on the identified hacking attempt to determine whether it is a false alarm. The investigation can be performed based on the context information of the transactions between the wallet and the smart contract. If the identified hacking attempt is determined to be a false alarm, the hacking attempt investigating unit 330 signals the blacklist updating unit 320 to remove the wallet from the blacklist 325. Further, the untainting call generating unit 335 sends an untainting call with respect to the wallet to the minting contract.

In an alternative example, the investigation on the hacking attempt can be carried out by an entity independent from the monitoring tool 300. In this case, the monitoring tool 300 receives an investigation result from that entity and decides accordingly whether to initiate a untainting process.

In additional, the monitoring unit 300 includes a suspicious wallet monitoring unit 340, a transfer attempt detecting unit 345, and a transfer attempt blocking unit 350. The suspicious wallet monitoring unit 340 monitors the blockchain to see if the blacklisted wallet attempts to transfer funds to another wallet. If so, the transfer attempt detecting unit 345 signals the blacklist updating unit 320 to add the transferee wallet into the blacklist 325. At the same time, the tainting call generating unit 315 sends a tainting call with respect to the transferee wallet to the minting contract.

Figure 4:
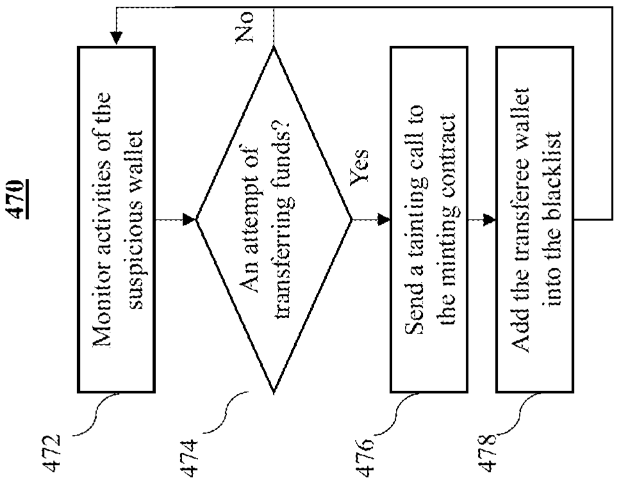
FIG. 4 is an algorithmic flow chart of a process performed by a monitoring tool according to exemplary aspects of the present disclosure.
Figure 4:
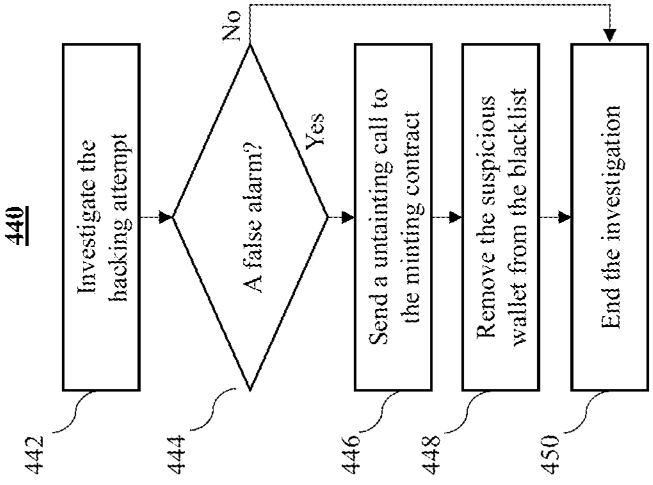
Figure 4:
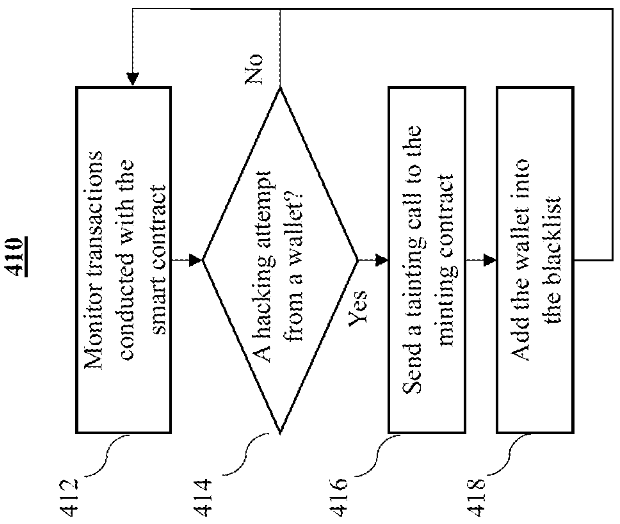

FIG. 4 is an algorithmic flow chart of a process performed by a monitoring tool according to exemplary aspects of the present disclosure. On the left side of FIG. 4 is a hacking attempt identification subprocess 410 implemented by the monitoring tool. At step 412, transactions conducted with a smart contract are monitored. If a hacking attempt by a wallet is identified from the transactions ("Yes" at step 414), a tainting call is sent to a minting contract at step 416 so as to mark the wallet as suspicious. At step 418, the wallet is added into a blacklist related to the smart contract. If no hacking attempt is identified ("No" at step 414), the subprocess 410 returns to step 412 to continue the monitoring of the transactions.

On the right side of FIG. 4 is a fund transfer blocking subprocess 470. At step 472, the activities of the suspicious wallet are monitored. If an attempt of transferring funds by the wallet to another wallet is detected ("Yes" at step 474), a tainting call is sent to the minting contract such that the minting contract marks the transferee wallet as suspicious. Further, at step 478, the transferee wallet is added into the blacklist. If no attempt to transfer funds is identified ("No" at step 474), the subprocess 470 returns to step 472 to continue the monitoring of the activities.

In the middle of FIG. 4 is a hacking attempt investigation subprocess 440 performed by the monitoring tool. At step 442, the hacking attempt is investigated to decide if it is a false alarm. If the hacking attempt is determined to be a false alarm ("Yes" at step 444), a untainting call is sent to the minting contract. Further, at step 448, the suspicious wallet is removed from the blacklist (and optionally, the transferee wallet is removed from the blacklist as well), which ends the investigation subprocess 440. If the investigation result is that the hacking attempt is not a false alarm ("No" at step 444), the investigation subprocess 440 skips to the end.

Figure 5:
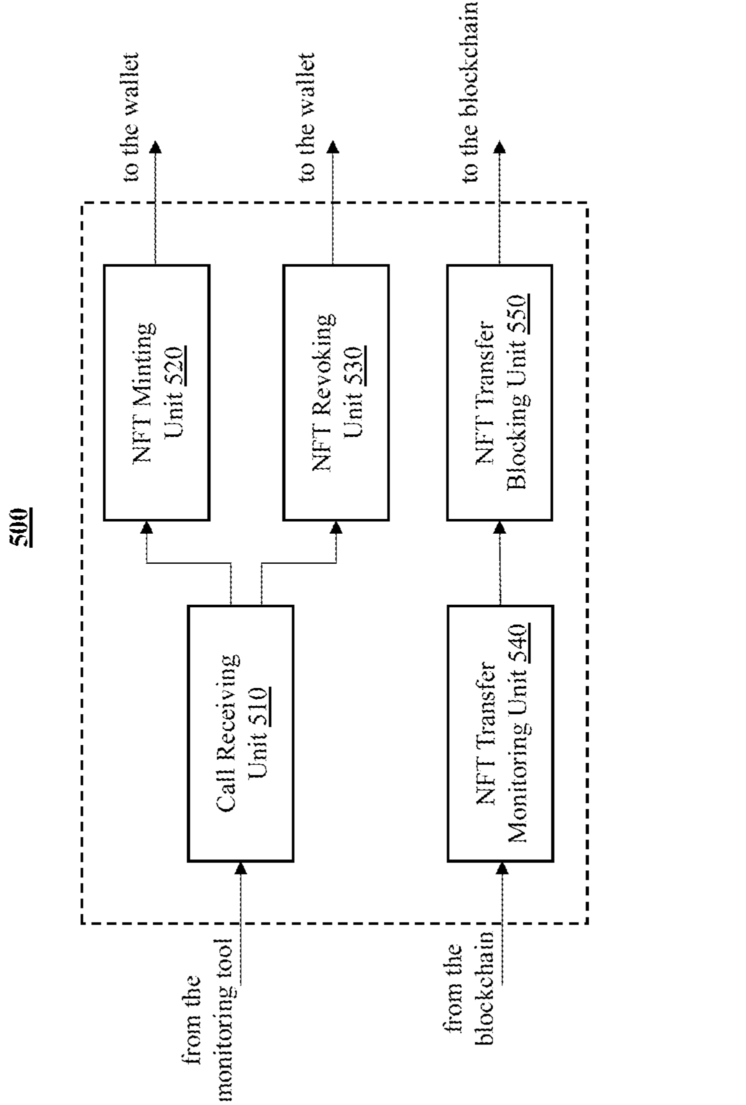
FIG. 5 is a functional block diagram of a minting contract according to exemplary aspects of the present disclosure.

FIG. 5 is a functional block diagram of a minting contract according to exemplary aspects of the present disclosure. The minting contract 500 includes a call receiving unit 510, a NFT minting unit 520, and a NFT revoking unit 530. The call receiving unit 510 receives a call sent by a monitoring tool. If the call received is a tainting call with respect to a certain wallet, the NFT minting unit 520 mints and airdrops a soulbound NFT into the wallet to identify the wallet as a suspicious wallet. In a non-limiting example, metadata of the soulbound NFT can indicates various information, for example, the identification of the minting contract 500, the time of airdropping the NFT, the status of the NFT (e.g., valid and invalid), information regarding the transaction or event which is a basis of the tainting call, or the like.

If the call received is an untainting call with respect to a suspicious wallet, the NFT revoking unit 530 revokes the soulbound NFT that exists in the wallet. Optionally, the soulbound token in the transferee wallet can be revoked as well. The revocation of the soulbound NFT can be implemented by any feasible means. In a non-limiting example, the revocation can be implemented by modifying the status of the NFT from valid to invalid.

Note that although in the examples shown in FIGS. 3-6 the revocation of the soulbound NFT is performed by the minting contract 500 in response to a untainting call from the monitoring tool 300, in another example, the untainting process can be done by the monitoring tool 300 itself, without involvement of the original minting contract 500. If the metadata is stored in an AWS S3 bucket, the monitoring tool 300 can modify the status of the NFT from valid to invalid by simply amending a corresponding file, for example. Alternatively, in yet another example, the untainting process can be done by adding the suspicious wallet into a whitelist.

As illustrated in FIG. 5, the minting contract 500 also includes a NFT transfer monitoring unit 540 and a NFT transfer blocking unit 550. The NFT transfer monitoring unit 540 monitors the blockchain to detect if a suspicious wallet is attempting to transfer a NFT that the minting contract 500 has airdropped. When such an attempt is detected, the NFT transfer blocking unit 550 blocks the transfer.

Figure 6:
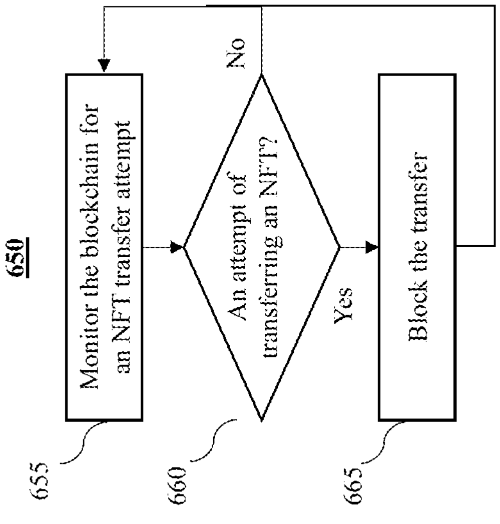
FIG. 6 is an algorithmic flow chart of a process performed by a minting contract according to exemplary aspects of the present disclosure.
Figure 6:
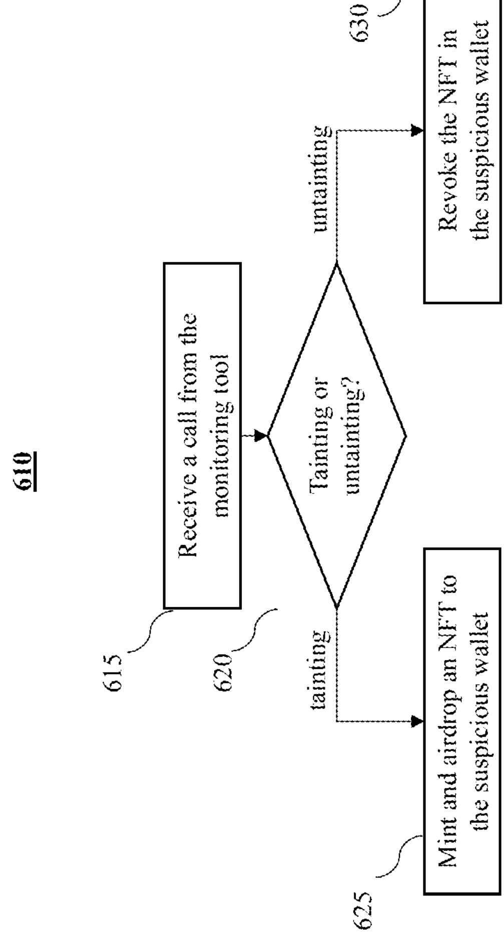

FIG. 6 is an algorithmic flow chart of a process performed by a minting contract according to exemplary aspects of the present disclosure. A tainting/untainting subprocess 610 is shown on the left side. At step 615, a call is a received from a monitoring tool. If the call received is a tainting call with respect to a certain wallet (the left branch of step 620), a soulbound NFT is minted and airdropped into the wallet at step 625 so as to identify the wallet as a suspicious wallet. If the call received from the monitoring tool is an untainting call with respect to a suspicious wallet (the right branch of step 620), the NFT in the wallet that the minting contract has airdropped is revoked at step 630.

A NFT transfer blocking subprocess 650 is shown on the right side of FIG. 6. At step 655, transactions on the blockchain are monitored to detect if a suspicious wallet attempts to transfer a NFT that the minting contract has airdropped. If an attempt of transferring the NFT is detected ("Yes" at step 660), the transfer is blocked by the minting contract at step 665. If no such an attempt is detected ("No" at step 660), the subprocess returns to step 655 to continue the monitoring.

Figure 7:
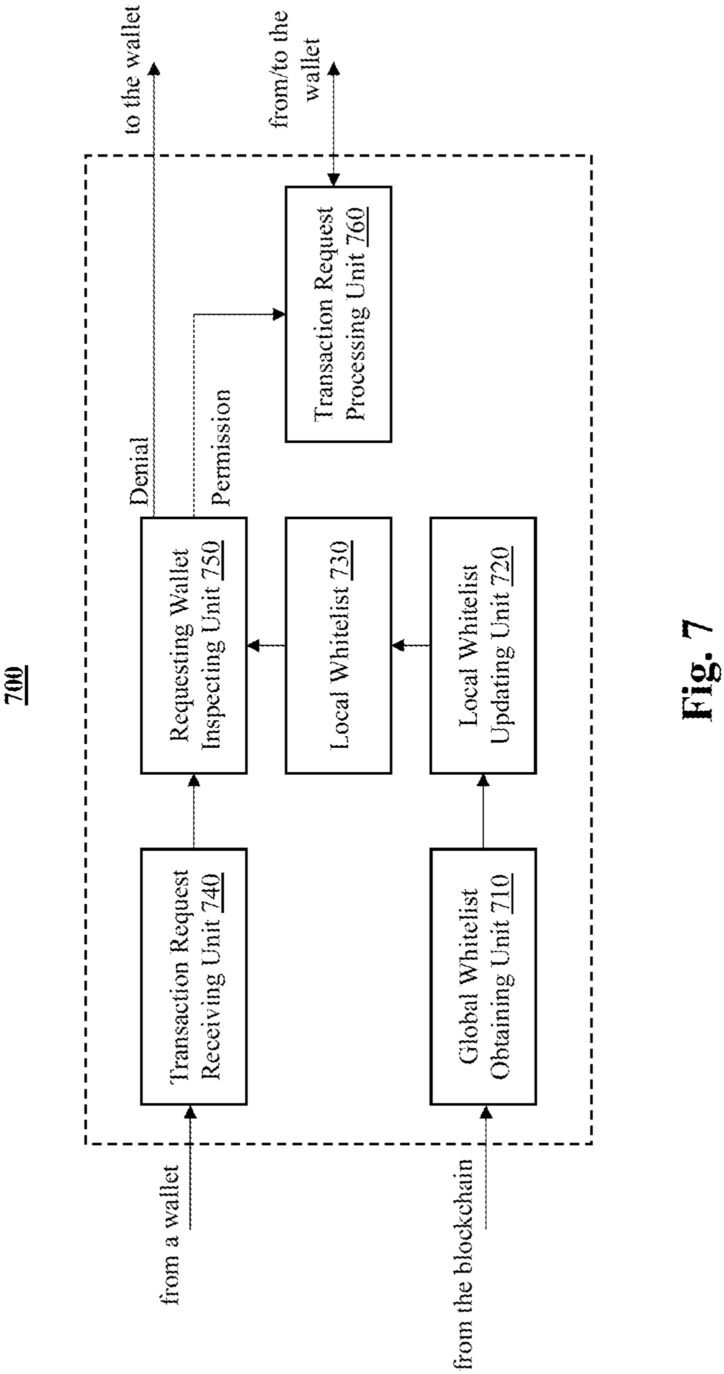
FIG. 7 is a functional block diagram of a smart contract according to exemplary aspects of the present disclosure.

FIG. 7 is a functional block diagram of a smart contract according to exemplary aspects of the present disclosure. The smart contract 700 includes a global whitelist obtaining unit 710, a local whitelist updating unit 720, and a local whitelist 730. The global whitelist obtaining unit 710 obtains a global whitelist from an on-chain or off-chain trusted source. The local whitelist update unit 720 updates the local whitelist 730 based on the obtained global whitelist. For example, the global whitelist can be maintained by the community or certain authorities, and published regularly (e.g., weekly, monthly, etc.) at a website. The global whitelist can include a list of trusted or approved sources of soulbound NFTs, for example, minting contracts that airdrop NFTs and/or monitoring tools that send tainting calls. In this way, new minting contracts and new monitoring tools can get registered through the global whitelist and thus be accepted by existing smart contracts. Note that when the global whitelist is updated not very frequently (for example, less than once a month), manual update of the local whitelist 730 at the smart contract 700 is feasible.

The smart contract 700 further includes a transaction request receiving unit 740, a requesting wallet inspecting unit 750, and a transaction request processing unit 760. The transaction request receiving unit 740 receives a transaction request from a wallet. The requesting wallet inspecting unit 750 inspects the requesting wallet to determine whether the requesting wallet has an NFT from a whitelisted source (e.g., a trusted minting contract and/or a trusted monitoring tool). Then, the requesting wallet inspecting unit 750 rejects the transaction request if the requesting wallet has such an NFT. If the requesting wallet does not have any valid NFTs from a whitelisted source, the transaction request processing unit 760 processes the transaction request based on the policies of the smart contract.

Figure 8:
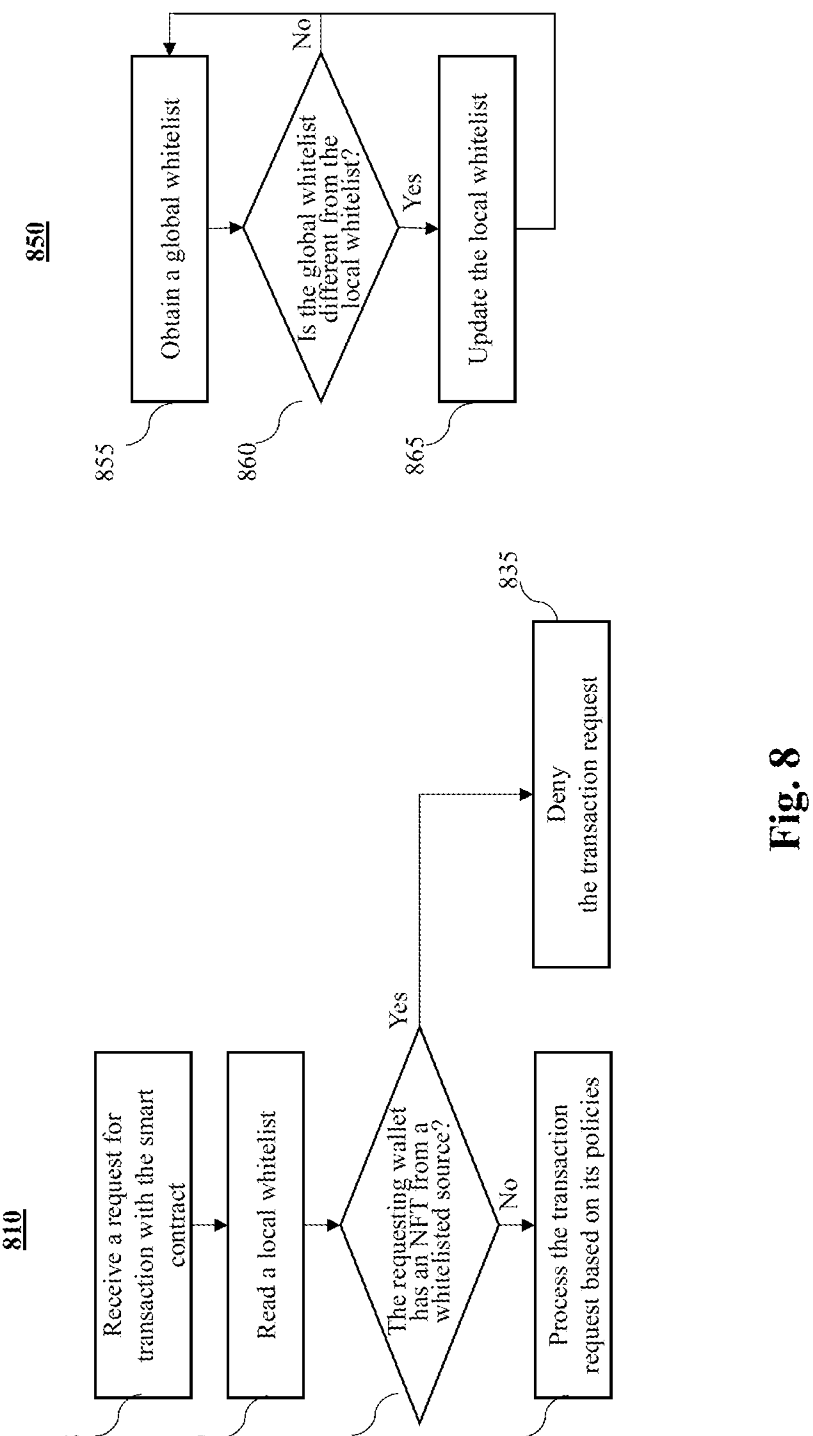
FIG. 8 is an algorithmic flow chart of a process performed by a smart contract according to exemplary aspects of the present disclosure.

FIG. 8 is an algorithmic flow chart of a process performed by a smart contract according to exemplary aspects of the present disclosure. On the left side of FIG. 8 is a transaction request processing subprocess 810. At step 815, a request for conducting a transaction with the smart contract is received from a wallet. At step 820, the local whitelist is read. At step 825, it is determined whether the requesting wallet has an NFT from a whitelisted source. If the wallet has such an NFT ("Yes" at step 825), the transaction request is denied at step 835. If the wallet does not have such an NFT ("No" at step 825), the transaction request is processed by the smart contract based on internal policies at step 830.

On the right side of FIG. 8, a whitelist updating subprocess 850 is illustrated. At step 855, a global whitelist is obtained by the smart contract. At step 860, it is determined whether there is a difference between the global whitelist and the local whitelist. If the determination result is positive ("Yes" at step 860), the local whitelist is updated based on the global whitelist. If the determination result is negative ("No" at step 860), the subprocess returns until a new global whitelist is obtained.

For the sake of clarity, the functional modules for processing the transaction request based on whether the requesting wallet is in the blacklist maintained by a respective monitoring tool are omitted from FIG. 7. Similarly, the corresponding steps are omitted from the process illustrated in FIG. 8.

Figure 9:
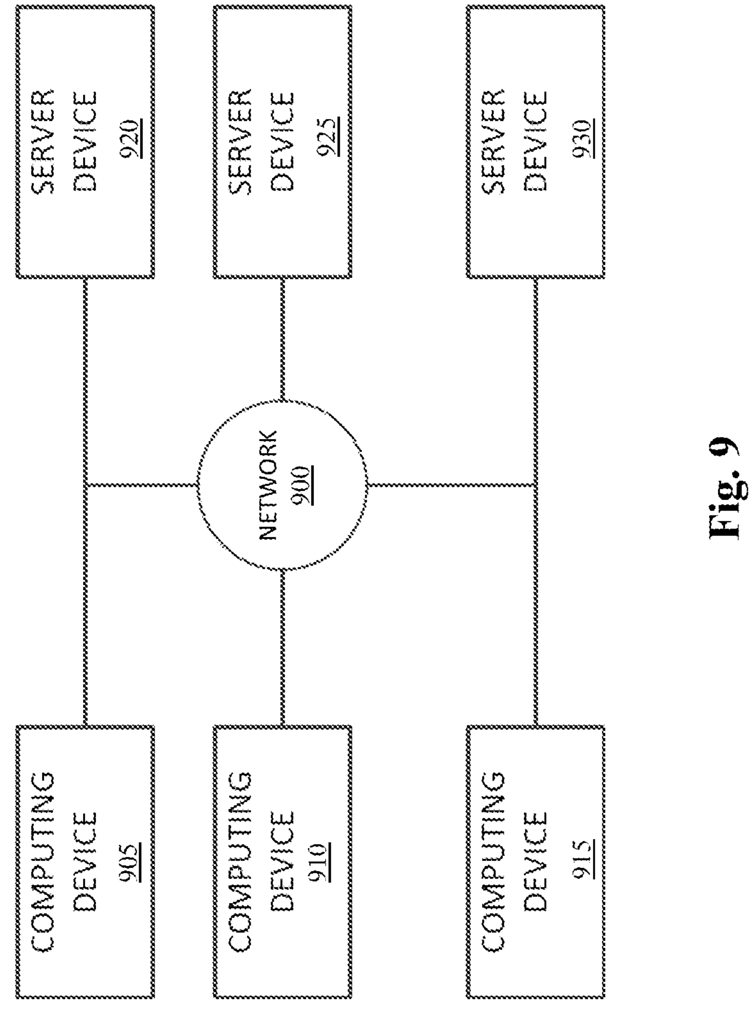
FIG. 9 is an exemplary block diagram of a system that may form one or more of the blocks illustrated in FIG. 2A.

FIG. 9 is an exemplary block diagram of a system that may form one or more of the blocks illustrated in FIG. 2A. For example, the system illustrated in FIG. 9 may correspond to any of the smart contracts 201-203, any of the monitoring tools 211-213, the minting contract 230, the entity (not shown) that generates the global whitelist 240, or any of the wallets 251-253. In the event that any of the blocks in FIG. 2A are encompassed in a single system, that single system may be exemplified by the one illustrated in FIG. 9. For example, the smart contract 201 and the monitoring tool 211 may be part of a single system such as that of FIG. 9. Other combinations of the different blocks of FIG. 2A into a single system, such as that of FIG. 9, are also possible as can be appreciated.

The exemplary system illustrated in FIG. 9 includes a plurality of computing devices 905, 910, 915 and a plurality of server devices 920, 925, 930 interconnected by a network (for example, a local area network (LAN)) 900. As can be appreciated, the network 900 may be a packet-switch network that is private, public, or a combination of private and public. The network 900 may also include wired and wireless portions, and may be connected to a public network, such as the Internet.

The computing devices 905, 910, 915 can include desktop computers, laptop computers, tablet computers, mobile phones, thin clients, and any other known computing device. The computing devices 905, 910, 915 may also have permanent, semi-permanent, or temporary connections to the network 900. These connections may also be wired, such as an Ethernet connection, or may be wireless, such as a WiFi, Bluetooth, or cellular connection (i.e., 3G, 4G, LTE, etc.). Though three computing devices 905, 910, 915 are illustrated, the system of FIG. 9 may include any number of computing devices without limitation.

The server devices 920, 925, and 930 are connected to the network 900 via permanent connections, and may store data and may provide services to the computing devices 905, 910, 915, such email, database services, and the like. In the system of FIG. 9, there may be more than three servers or fewer than three servers without limitation.

Figure 10:
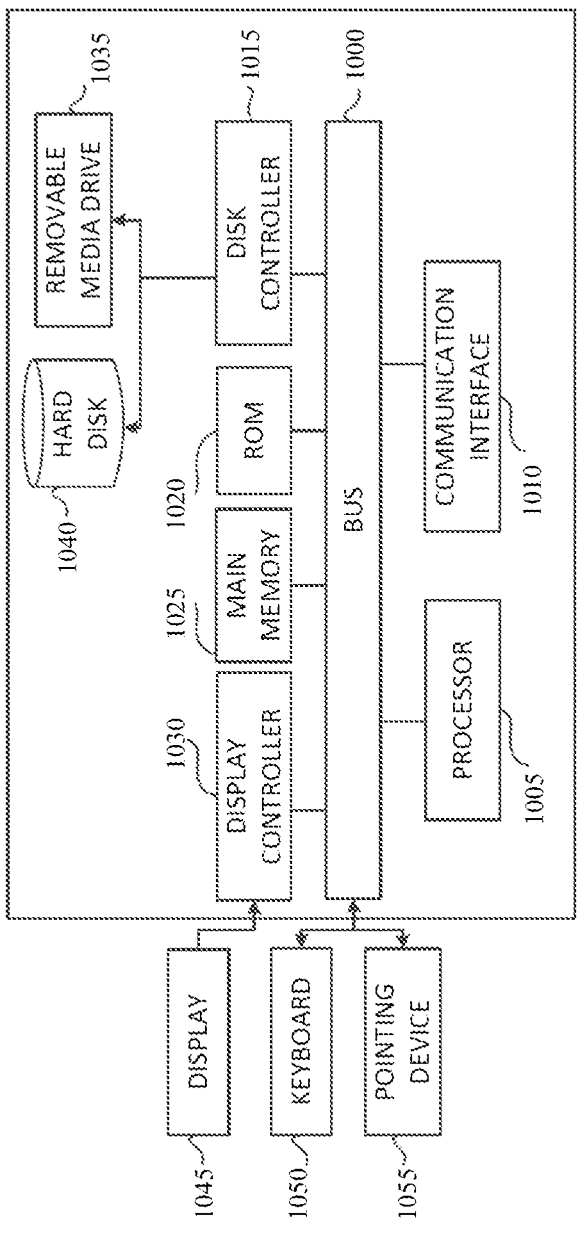
FIG. 10 is a hardware diagram of a computing device according to exemplary aspects of the present disclosure.

Next, a description of the hardware of computing devices 905, 910, 915 and server devices 920, 925, 930 is provided with reference to FIG. 10. In the event that the blocks illustrated in FIG. 2A correspond to individual devices, the hardware of those devices may also be as illustrated in FIG. 10. The device of FIG. 10 includes a processor 1005, communication interface 1010, main memory 1025, read only memory (ROM) 1020, disk controller 1015, display controller 1030, hard disk 1040, and removable media drive 1035.

The processor 1005 may be based on a reduced instruction set (RISC) circuit architecture, Von Neumann architecture, Harvard architecture, or any other processing circuit architecture that is known. The processor 1005 may also be implemented as a system on a chip, application specific integrated circuit (ASIC), field programmable gate array (FPGA), or with discrete logic circuit components. The processor 1005 may also be implemented in software that is executed on processing circuitry having any of the architectures described above.

The communication interface 1010 is a circuit that connects the device of FIG. 10 to one or more communication networks, such as an Ethernet network, a cellular network, a WiFi network, a Bluetooth network, and the like. For example, the communication interface 1010 may be a network interface card (NIC).

The main memory 1025 and the ROM 1020 are used to store instructions and other data needed by the processor 1005 in order to carry out various tasks in accordance with exemplary aspects of the present disclosure. Specifically, the ROM 1030, being a read-only memory circuit, may include permanent instructions that do not require changes, such as lower-level routines. The main memory 1025 may include a combination of random access memory and erasable programmable read only memory (EPROM) in order to store programming instructions that may be periodically updated and data that may change periodically or frequently during as the processor 1005 executes instructions.

The display controller 1030 is an interface circuit that permits a display 1045, such as a liquid crystal display, to be connected to the device of FIG. 10 in order to provide visual information to a user thereof. The disk controller 1015 is an interface circuit that permits devices such as a hard disk 1040, which provides mass storage, to be connected to the bus 1000 and therefore, the processor 1005. The disk controller 1015 also permits the connection of other removable media 1035, such as an optical disk reader or a secure digital (SD) card, a memory stick and the like. A keyboard 1050 and a pointing device 1055, such as a mouse, may also be connected to the device illustrated in FIG. 10 to provide a way of entering data into the device by a user thereof. Further description of these components is omitted for the sake of brevity.

Obviously, numerous modifications and variations of the present invention are possible in light of the above teachings. It is therefore to be understood that within the scope of the appended claims, the invention may be practiced otherwise than as specifically described herein.

The invention claimed is:

1. A system for sharing a distributed revocation list on a blockchain, the system comprising:

circuitry configured to:

receive information indicating a first digital wallet on a first blockchain network is suspicious, add the first digital wallet to the distributed revocation list, the distributed revocation list including a list of digital wallets indicated as being suspicious, generate a first soulbound token request, transmit the first soulbound token request to a first smart contract of the first blockchain network, wherein the first soulbound token request is configured to instruct the first smart contract to generate a first soulbound token and airdrop the first soulbound token to the first digital wallet, upon detecting a transaction request from the first digital wallet to a second digital wallet on a second blockchain network separate from the first blockchain network, determine whether the first digital wallet includes the first soulbound token, upon determining the first digital wallet includes the first soulbound token and upon determining the first soulbound token was airdropped from a source in a local authorized source list of the second blockchain network, deny the transaction request on the second blockchain network, and add the second digital wallet to the distributed revocation list, the second digital wallet marked as being associated with the first digital wallet, and upon determining the distributed revocation list includes a new entry after adding the second digital wallet to the distributed revocation list, transmit an updated distributed revocation list to the second blockchain network, wherein the first soulbound token indicates that the first digital wallet is on the distributed revocation list, and wherein a suspicious status follows the first digital wallet to any additional digital wallet associated with the first digital wallet.

2. The system according to claim 1, wherein the circuitry is further configured to:

upon detecting the transaction request from the first digital wallet to the second digital wallet, and upon determining the first digital wallet includes the first soulbound token and the first soulbound token was airdropped from the source in the local authorized source list of the second blockchain network, generate a second soulbound token, and airdrop the second soulbound token to the second digital wallet.

3. The system according to claim 2, wherein the circuitry is further configured to:

upon detecting a transaction request from the second digital wallet, determine whether the second digital wallet includes the second soulbound token, and upon determining the second digital wallet includes the second soulbound token, reject the transaction request from the second digital wallet.

4. The system according to claim 1, wherein the circuitry is further configured to monitor a transaction conducted by the first digital wallet on the first blockchain network to identify the transaction is a suspicious event.

5. The system according to claim 1, wherein the circuitry is further configured to:

determine whether the first digital wallet being suspicious is false, and upon determining the first digital wallet being suspicious is false;

revoke the first soulbound token in the first digital wallet, and remove the first digital wallet from the distributed revocation list.

6. The system according to claim 5, wherein the circuitry is further configured to perform revocation of the first soulbound token by amending metadata of the first soulbound token.

7. The system according to claim 4, wherein the circuitry is further configured to determine whether the suspicious event is false based on context information related to the transaction.

8. The system according to claim 1, wherein the circuitry is further configured to upon detecting an attempt by the first digital wallet to transfer the first soulbound token, block transfer of the first soulbound token.

9. The system according to claim 1, wherein the circuitry is further configured to:

upon detecting a transaction request from the first digital wallet, determine whether the first digital wallet is in the distributed revocation list, and upon determining the first digital wallet is in the distributed revocation list, reject the transaction request.

10. The system according to claim 1, wherein the circuitry is further configured to upon receiving the information indicating the first digital wallet on the first blockchain network is suspicious, pause the first blockchain network.

11. The system according to claim 1, wherein upon detecting the transaction request from the first digital wallet to the second digital wallet, the circuitry is further configured to upon determining the first soulbound token was not sent from a source in the local authorized source list, process the transaction request based on a policy of the second blockchain network corresponding to the second digital wallet.

12. The system according to claim 11, wherein the circuitry is further configured to generate a global authorized source list, and the second blockchain network obtains the global authorized source list, and updates the local authorized source list based on the obtained global authorized source list.

13. The system according to claim 1, wherein the circuitry is further configured to send the first soulbound token with a highest priority.

14. The system according to claim 2, wherein the circuitry is further configured to send the second soulbound token with a highest priority.

15. The system according to claim 1, wherein the first digital wallet is suspicious based on a transaction by the first digital wallet being a suspicious event, the suspicious event including at least one of an exploit, a heist, fund laundering, theft, a phishing attack, an unauthorized intrusion, and an unauthorized access attempt.

16. The system according to claim 1, wherein the circuitry is further configured to, before determining the first digital wallet includes the first soulbound token and determining the first soulbound token was sent from the source in the local authorized source list of the second blockchain network, update the local authorized source list of the second blockchain network based on a global authorized source list of the first blockchain network.

17. The system according to claim 1, wherein:

the circuitry is further configured to transmit an investigation request to a remote processing device to determine whether the first digital wallet is suspicious, and the circuitry receives the information indicating the first digital wallet on the first blockchain network is suspicious from the remote processing device.

18. A method for sharing a distributed revocation list on a blockchain, the method comprising:

receiving, by circuitry, information indicating a first digital wallet on a first blockchain network is suspicious;

adding, by the circuitry, the first digital wallet to the distributed revocation list the distributed revocation list including a list of digital wallets indicated as being suspicious;

generating a first soulbound token request, transmitting the first soulbound token request to a first smart contract of the first blockchain network, wherein the first soulbound token request is configured to instruct the first smart contract to generate a first soulbound token and airdrop the first soulbound token to the first digital wallet, upon detecting a transaction request from the first digital wallet to a second digital wallet on a second blockchain network separate from the first blockchain network, determining whether the first digital wallet includes the first soulbound token;

upon determining the first digital wallet includes the first soulbound token and upon determining the first soulbound token was airdropped from a source in a local authorized source list of the second blockchain network, denying the transaction request on the second blockchain network; and adding the second digital wallet to the distributed revocation list, the second digital wallet marked as being associated with the first digital wallet; and upon determining the distributed revocation list includes a new entry after adding the second digital wallet to the distributed revocation list, transmitting an updated distributed revocation list to the second blockchain network, wherein the first soulbound token indicates that the first digital wallet is on the distributed revocation list, and wherein a suspicious status follows the first digital wallet to any additional digital wallet associated with the first digital wallet.

19. A non-transitory computer readable medium including computer readable instructions, which when executed by at least one processor, causes the at least one processor to perform a method for sharing a distributed revocation list on a blockchain, the method comprising:

receiving information indicating a first digital wallet on a first blockchain network is suspicious;

adding the first digital wallet to the distributed revocation list the distributed revocation list including a list of digital wallets indicated as being suspicious;

generating a first soulbound token request, transmitting the first soulbound token request to a first smart contract of the first blockchain network, wherein the first soulbound token request is configured to instruct the first smart contract to generate a first soulbound token and airdrop the first soulbound token to the first digital wallet, upon detecting a transaction request from the first digital wallet to a second digital wallet on a second blockchain network separate from the first blockchain network, determining whether the first digital wallet includes the first soulbound token;

upon determining the first digital wallet includes the first soulbound token and upon determining the first soulbound token was sent airdropped from a source in a local authorized source list of the second blockchain network, denying the transaction request on the second blockchain network; and adding the second digital wallet to the distributed revocation list, the second digital wallet marked as being associated with the first digital wallet; and upon determining the distributed revocation list includes a new entry after adding the second digital wallet to the distributed revocation list, transmitting an updated distributed revocation list to the second blockchain network, wherein the first soulbound token indicates that the first digital wallet is on the distributed revocation list, and wherein a suspicious status follows the first digital wallet to any additional digital wallet associated with the first digital wallet.

* * * * *